United States Patent
Weber

(10) Patent No.: US 11,593,157 B2
(45) Date of Patent: Feb. 28, 2023

(54) FULL ASYNCHRONOUS EXECUTION QUEUE FOR ACCELERATOR HARDWARE

(71) Applicant: NEC Laboratories Europe GmbH, Heidelberg (DE)

(72) Inventor: Nicolas Weber, Dossenheim (DE)

(73) Assignee: NEC CORPORATION, Tokyo (JP)

( * ) Notice: Subject to any disclaimer, the term of this patent is extended or adjusted under 35 U.S.C. 154(b) by 309 days.

(21) Appl. No.: 16/861,367

(22) Filed: Apr. 29, 2020

(65) Prior Publication Data
US 2021/0240526 A1    Aug. 5, 2021

(30) Foreign Application Priority Data
Feb. 5, 2020    (EP) .................................. 20155614

(51) Int. Cl.
| | | |
|---|---|---|
| G06F 9/50 | (2006.01) | |
| G06F 9/48 | (2006.01) | |
| G06F 12/1009 | (2016.01) | |
| G06F 13/42 | (2006.01) | |
| G06F 12/0875 | (2016.01) | |
| G06F 9/38 | (2018.01) | |

(52) U.S. Cl.
CPC .......... *G06F 9/4881* (2013.01); *G06F 9/3806* (2013.01); *G06F 9/5016* (2013.01); *G06F 12/0875* (2013.01); *G06F 12/1009* (2013.01); *G06F 13/4239* (2013.01)

(58) Field of Classification Search
CPC .. G06F 9/4881; G06F 9/5016; G06F 12/1009; G06F 12/02

USPC ........................................................ 718/104
See application file for complete search history.

(56) References Cited

U.S. PATENT DOCUMENTS

| | | |
|---|---|---|
| 5,301,287 A | 4/1994 | Herrell et al. |
| 5,442,802 A | 8/1995 | Brent et al. |
| 6,092,124 A | 7/2000 | Priem et al. |
| 9,009,712 B2 | 4/2015 | Schmit et al. |
| 9,448,779 B2 | 9/2016 | Grover et al. |
| 2002/0199069 A1* | 12/2002 | Joseph .................. G06F 9/5016 711/147 |

(Continued)

FOREIGN PATENT DOCUMENTS

| | | | |
|---|---|---|---|
| CN | 104835110 A | 8/2015 | |
| WO | WO 2015/109338 A1 | 7/2015 | |
| WO | WO-2015109338 A1 * | 7/2015 | ........... G06F 9/5016 |

OTHER PUBLICATIONS

Nvidia, "CUDA C Programming Guide Design Guide", Nvidia, US, Sep. 1, 2015 (Sep. 1, 2015), pp. 1-246, XP055537201.

(Continued)

*Primary Examiner* — Than Nguyen
(74) *Attorney, Agent, or Firm* — Leydig, Voit & Mayer, Ltd.

(57) ABSTRACT

A method for providing an asynchronous execution queue for accelerator hardware includes replacing a malloc operation in an execution queue to be sent to an accelerator with an asynchronous malloc operation that returns a unique reference pointer. Execution of the asynchronous malloc operation in the execution queue by the accelerator allocates a requested memory size and adds an entry to a look-up table accessible by the accelerator that maps the reference pointer to a corresponding memory address.

14 Claims, 5 Drawing Sheets

(56) References Cited

U.S. PATENT DOCUMENTS

2012/0179882 A1* 7/2012 Bernhard, III ........ G06F 9/5022
                                                      711/171
2016/0048394 A1   2/2016 Vorbach et al.
2016/0125565 A1   5/2016 Sulatycke et al.
2020/0319812 A1* 10/2020 He ...................... G06F 3/0604

OTHER PUBLICATIONS

Shinta Nakagawa et al: "A middleware for efficient stream processing in CUDA", Computer Science—Research and Development ; Computer Science—Research and Development Organ Der Fachbereiche Softwaretechnik, Datenbanken Und Informationssysteme Der Gesellschaft Fuer Informatik E.V. (GI), Springer-Verlag, Berlin/Heidelberg, vol. 25, No. 1-2, Apr. 15, 2010 (Apr. 15, 2010), pp. 41-49, XP019849834.

Lee, JongHyuk et al. "Acceleration of Bulk Memory Operations in a Heterogeneous Multicore Architecture," PACT'12, Sep. 19-23, 2012, Minneapolis, Minnesota, USA.

Sun, Weibin "Harnessing GPU Computing in System-Level Software," PhD Dissertation, The University of Utah, Aug. 2014.

Basu, Arkaprava et al. "Efficient Virtual Memory for Big Memory Servers," ACM, ISCA'13 Tel-Aviv, Israel, Jun. 2013.

Go, Younghwan et al. "APUNet: Revitalizing GPU as Packet Processing Accelerator," 14th USENIX Symposium on Networked Systems Design and Implementation, Mar. 27-29, 2017.

Yalamanchili, Sudhakar, "CUDA Execution Model—III: Streams and Events," Georgia Tech Institute of Technology, Jan. 2018.

Oden, Lena, "Direct Communication Methods for Distributed GPUs," Dissertation, University of Heidelberg, Apr. 15, 2015.

Shi, Xuanhua et al. "Frog: Asynchronous Graph Processing on GPU with Hybrid Coloring Model," Aug. 2017.

Ben-Nun, Tal et al. "Groute: An Asynchronous Multi-GPU Programming Model for Irregular Computations," ACM, PPoPP'17, Feb. 4-8, 2017, Austin, TX, USA.

Sarton, Jonathan et al. "Interactive Visualization and On-Demand Processing of Large Volume Data: A Fully GPU-Based Out-Of-Core Approach," IEEE Transactions on Visualization and Computer Graphics, Institute of Electrical and Electronics Engineers, In press, 10.1109/TVCG.2019.2912752. hal-01705431v3, Feb. 5, 2020.

Harris, Mark, "How to Overlap Data Transfers in CUDA C/C++" Nvidia Corporation, https://devblogs.nvidia.com/how-overlap-data-transfers-cuda-cc/, Dec. 13, 2012.

* cited by examiner

| State of the Art | Proposed with SOL |
|---|---|
| API (Python, C/C++, ...) | API (Python, C/C++, ...) |
| Framework Core | Framework Core |
| Device Backends | SOL |

FIG. 5

| Frameworks Frontends | ... | Compiler | | | | | | | | | | | |
|---|---|---|---|---|---|---|---|---|---|---|---|---|---|
| | TensorFlow | DFP | ISPC | CUDA | NCC | DNN | DNNL | NNPACK | OpenBLAS | CUBLAS | CUDNN | VEDNN | VEBKAS |
| | PyTorch | Device Backends | | | | | | | | | | | |
| | | X86 | | | ARM64 | | | NVIDIA | | | SX - Aurora | | |
| | | Runtime | | | | | | | | | | | |

FIG. 6

FULL ASYNCHRONOUS EXECUTION QUEUE FOR ACCELERATOR HARDWARE

CROSS-REFERENCE TO RELATED APPLICATION

Priority is claimed to European Patent Application No. EP 20 155 614.9, filed on Feb. 5, 2020, the entire disclosure of which is hereby incorporated by reference herein.

FIELD

The present invention relates to a method and system for providing a full asynchronous execution queue for accelerator hardware. Accelerator hardware is used, in particular, by computing clusters to overcome the limited compute power of central processing units (CPUs) in different technical fields which require high performance computing, such as computer simulations, numerical applications or artificial intelligence (AI).

BACKGROUND

Modern high performance computing clusters heavily rely on accelerators to overcome the limited compute power of CPUs. These supercomputers run various applications from different technical fields such as computer simulations, numerical applications or AI. As a result, vendors need to be able to efficiently run a wide variety of workloads on their hardware.

In the AI domain, this problem is in particular exacerbated by the existence of a number of popular AI frameworks (e.g., PyTorch, TensorFlow, etc.) that have no common code base, and can vary in functionality. The code of these frameworks evolves quickly, making it expensive to keep up with all changes and potentially forcing developers to go through constant rounds of upstreaming.

AI has undoubtedly become one of the hottest fields in computer science today, with software and hardware vendors alike competing for a share of the big economic and scientific pie. Within the AI domain, PyTorch and TensorFlow have surfaced as the most widely used AI frameworks today, to the point that hardware vendors are required to support at least one of these in order to get any kind of user adoption. As already indicated above, these frameworks are open source projects with large communities and are rapidly evolving, thereby requiring constant maintenance and code up-streaming. Because this is a tedious and time-consuming task that is computationally burdensome and needs to be repeated for every release of the framework, it has become common practice to branch the framework, add hardware device support for it, and then publish the result as a separate installation package. Although this makes the life of the vendor much easier, it places the maintenance and computational burden on the user, who needs to utilize significant time and computational resources to maintain different installations or Docker images of the same framework for different devices. Even worse, it prevents the users from being able to combine or mix devices from different vendors in their AI applications.

SUMMARY

In an embodiment, the present invention provides a method for providing an asynchronous execution queue for accelerator hardware. The method includes replacing a malloc operation in an execution queue to be sent to an accelerator with an asynchronous malloc operation that returns a unique reference pointer. Execution of the asynchronous malloc operation in the execution queue by the accelerator allocates a requested memory size and adds an entry to a look-up table accessible by the accelerator that maps the reference pointer to a corresponding memory address.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 5 schematically illustrates abstraction layers within AI frameworks according to the state of the art and according to an embodiment of the present invention (referred to herein as "SOL");

FIG. 6 schematically illustrates a system architecture for SOL; and

DETAILED DESCRIPTION

Figure 1:
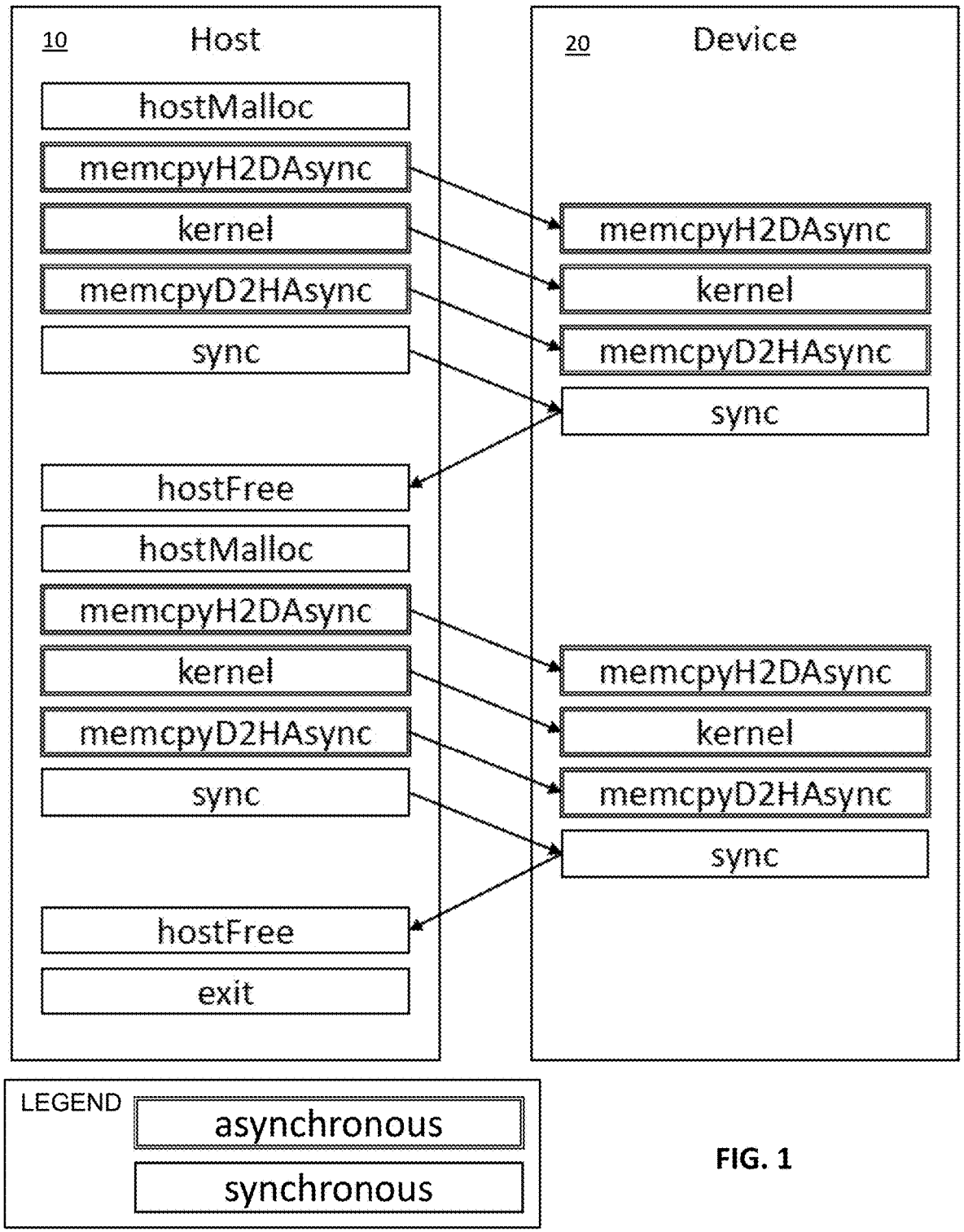
FIG. 1 illustrates a conventional execution of two kernel calls and a memcopy operation with an explicit synchronization before each hostFree operation.

Embodiments of the present invention provide a method and system for providing a full asynchronous execution queue for accelerator hardware in local or remote setups. Advantageously, the method and system can be applied to decouple the necessity to have a host system that controls the accelerator, while still allowing to use the same programming principles as in current setups. Moreover, even with a host, embodiments of the present invention have been demonstrated, as discussed herein, to provide a number of further improvements including enabling a number of flexible operations, reducing latency between the host and accelerator and increasing computational speed and efficiency (e.g., by avoiding synchronizations), thereby saving computational resources.

Modern accelerator programming models require to frequently synchronize executions between the host and the accelerator hardware (in the following also simply referred to as "device"). The following is an example from compute unified device architecture (CUDA), which is a computing platform and application programming interface from the company NVIDIA:

cudaStream_t stream=cudaCreateStream(deviceIdx); // create an asynchronous execution queue
auto h_ptr=malloc(size); // allocates memory on the host

```
auto d_ptr=cudaMalloc(size); // allocates memory on the
device cudaMemcpyAsync(d_ptr, h_ptr, size, stream); //
copy data to device asynchronously
myKernel<<< . . . , stream>>>( . . . ); // function call, also
asynchronous cudaMemcpyAsync(h_ptr, d_ptr, size,
stream); // copy data to host asynchronously
cudaStreamSynchronize(stream); // wait for all operations to
complete cudaFree(d ptr); // we cannot free the data on the
device before explicitly synchronizing
```

In this example, only three operations are scheduled to the device before needing to synchronize. The host system is the "master" of the device. Therefore, the host is usually in command of allocating memory in the device's memory. In the example above, whenever the cudaMalloc gets called, the host system allocates the memory and returns the pointer to the application. The cudaStream_t is an asynchronous execution queue, and the calls to cudaMemcpyAsync and myKernel<<< . . . >>> place a function into this queue. In contrast to this example, embodiments of the present invention also place the cudaMalloc and cudaFree into the asynchronous execution queue, which allows even higher asynchronousity. Also, as every synchronization needs to go through peripheral component interconnect express (PCIe) connections, it is preferable to be able to also call malloc and free operations within the execution queue. These operations, and how they are utilized in accordance with embodiments of the present invention, are discussed in greater detail below. The malloc and free operations will typically have different prefixes depending on the architecture (e.g., cudaMalloc and cudaFree in the example above from CUDA). However, such function calls apply to the different architectures and are generally referred to herein as malloc and free operations.

One challenge addressed by embodiments of the present invention in placing the malloc and free operations in the asynchronous execution queue is addressed by implementing a management of data pointers, as the application needs to have a pointer address to place the other function calls into the queue (e.g., the cudaMemcpyAsync), but as the malloc operation is executed asynchronously, it could be the case that it hasn't been executed. Accordingly, embodiments of the present invention provide a reference pointer, which then later on the device gets translated into a physical memory pointer. According to an embodiment of the present invention, the reference pointer is any unique number assigned by the system and is preferably a 64 bit number, that contains a 32 bit reference id and a 32 bit reference offset (e.g., 64 bit [reference pointer]=32 bit [reference id]+32 bit [reference offset]). This design allows has two improvements. First, the reference id allows to uniquely identify the allocation. Second, the reference offset allows the user to use normal pointer arithmetic on the reference pointer in order to maintain full functionality in the new design.

According to an embodiment of the present invention, all data pointers that are shared between the device and the host get replaced with reference pointers. In the example above, this could be accomplished by removing the "cudaStreamSynchronize" operation and replacing the "cudaMalloc (size)" and "cudaFree(d_ptr)" operations with: "cudaMalloc (size, stream)" and "cudaFree(d_ptr, stream)" operations, respectively. The original malloc operation just returns a pointer to part of the memory of the device. In contrast, the malloc operation according to embodiments of the present invention 1) returns a unique reference pointer, and 2) schedules the allocation of memory into the execution queue. When this allocation gets finally executed on the device, it allocates memory and stores the reference pointer and the memory pointer in a look-up table. Accordingly, when the cudaMalloc operation gets called, it does not allocate memory on the device, but rather schedules a "malloc" operation into the execution queue, and just returns a reference pointer, in this case containing a reference id instead of a memory address. Then, when the cudaFree operation gets called, it schedules a "free" instruction into the execution queue.

When the execution queue gets shipped off to the device, it goes through the execution queue, executing the scheduled operations. In case of a malloc operation, the device allocates the requested size, and stores the reference id with the memory pointer in a look-up table. Whenever a memcopy operation is executed, or a kernel is called, this reference pointer needs to be translated into a real hardware memory pointer, using the look-up table. The memory pointer points to a location in the device's memory, as in the case of calling a native malloc operation, and can be obtained, e.g., using the native malloc operation. This look-up table can either be implemented in software, or as an extension to the hardware's memory management unit (MMU). When a free operation is executed, the entry gets removed from the look-up table and the memory gets deallocated.

The following is exemplary pseudocode for implementing the embodiment of the present invention discussed above.

```
typedef uint64_t rptr_t;
static    std::unordered_map<rptr_t,    void*>   _lookup_
table;
_device_ void deviceAsyncMalloc(rptr_t rptr, size_t size) {
   auto ptr=malloc(size);
   _lookup_table[rptr]=ptr;
}
_device_ void* deviceAsyncTranslate(rptr_t rptr) {
   return _lookup_table.at(rptr);
}
template<typename T>
_device_ T* deviceAsyncTranslate(rptr_t rptr) {
   return (T*)deviceAsyncTranslate(rptr);
}
_device_ void deviceAsyncFree(rptr_t rptr) {
   auto it=_lookup_table.find(rptr);
   free(it→second);
   _lookup_table.erase(it);
}
_global_ void myKernel(rptr_t _in, rptr_t _out) {
   auto in=deviceAsyncTranslate<const float>(_in);
   auto out=deviceAsyncTranslate<float>(out);
   . . .
}
```

This pseudocode would operate to remove all synchronization operations for malloc and free operations within the existing code. However, in some instances, the code does not have a fixed argument list, but uses variadic arguments. Variadic arguments are function arguments (user data), whose size are unknown at compile time when the code gets translated into machine code. Accordingly, the application needs to be aware of this. Normally, the user needs to allocate a memory segment, copy all items into this memory segment and then pass the pointer along with the number of items to the accelerator function. In CUDA, this problem could be solved in accordance with an embodiment of the present invention based on the following exemplary pseudocode:

```
std::vector< . . . >h_vargs;
auto d_vargs=cudaMalloc(sizeof( . . . ) * h_vargs.size( ));
cudaMemcpyAsync(d_vargs, h_vargs.data( ), sizeof( . . . ) *
h_vargs.size( ); stream);
```

```
myKernel<<< . . . , stream>>>(d_vargs, h_vargs.data( )));
cudaStreamSynchronize(stream);
cudaFree(d_vargs);
```

Variadic arguments are function arguments (user data), whose size are unknown at compile time when the code gets translated into machine code. Accordingly, the application needs to be aware of this. Normally, the user needs to allocate a memory segment, copy all items into this memory segment and then pass the pointer the number of items to the accelerator function Another problem addressed by an embodiment of the present invention is that h_vargs (i.e., the variadic arguments in the code example above comprising any user defined data) may no longer exist when the memcopy operation is actually executed. The problem is that the variable "std::vector< . . . >h_vargs" has only local scope. So when the host application leaves the function, it will be destroyed. However, because of the asynchronous execution it cannot be guaranteed that the accelerator will execute the function before the host system leaves the function. Therefore, it is provided that the application programming interface (API) according to embodiments of the present invention creates a copy of h_vargs before the host system leaves the function. This problem is solved in accordance with an embodiment of the present invention based on the following exemplary pseudocode which includes variadic arguments stack for function calls:

```
std::vector< . . . >h_vargs;
offset_t  d_vargs=hostAsyncVariadic(h_vargs.data( ),
sizeof( . . . ) * h_vargs.size( )));
myKernel<<< . . . , stream>>>(d_vargs, h_vargs.size( )));
```

The foregoing pseudocode exemplifies a method used in an embodiment of the present invention and provides for the hostAsyncVariadic operation which copies the data in h_vargs directly into the variadic arguments stack and returns a memory offset. This stack gets copied to the accelerator together with the execution queue.

Within the accelerator's kernel, this offset then needs to be translated again by a method used in an embodiment of the present invention including an deviceAsyncTranslate(vargs) operation in accordance with the following exemplary pseudocode:

```
typedef uint64_t offset_t;
static char* _vargs;
_device_ void* deviceAsyncTranslate(offset_t offset) {
    return _vargs+offset;
}
template<typename T>
_device_ T* deviceAsyncTranslate(offset_t offset) {
    return (T*)deviceAsyncTranslate(offset);
}
_global_void myKernel(offset_t _vargs) {
    auto vargs=deviceAsyncTranslate<int>(_vargs);
    . . .
}
```

The hostAsyncVariadic and deviceAsyncTranslate operations are created/modified by embodiments of the present invention.

In the foregoing embodiments or other embodiments of the present invention, it can advantageously be provided for the user to be able to launch kernels that operate on only a specific area of the data the user has transferred to the device (i.e., only a small area of a bigger image). For this, normally the data pointer is used and an offset is added to it, thereby moving the data pointer to another location. Since this cannot be done using the reference pointer design in accordance with an embodiment of the present invention, as it is just a reference id, an embodiment of the present invention splits the reference pointer into an offset and a reference id using the following exemplary pseudocode:

```
union rptr_t {
    uint64_t rptr;
    struct {
        uint32_t offset;
        uint32_t id;
    } mask;
};
```

In an embodiment of the present invention, the deviceAsyncTranslate, deviceAsyncMalloc and deviceAsyncFree operations are modified as illustrated by the following exemplary pseudocode:

```
typedef uint64_t rptr_t;
static std::unordered_map<uint32 t, void*> _lookup_table;
_device_ void deviceAsyncMalloc(rptr_t rptr, size_t size) {
    auto ptr=malloc(size);
    _lookup_table[rptr.mask.id]=ptr;
}
_device_ void* deviceAsyncTranslate(rptr_t rptr) {
    return _lookup_table.at(rptr.mask.id)+rptr.mask.offset;
}
_device_ void deviceAsyncFree(rptr_t rptr) {
    auto it=_lookup_table.find(rptr.mask.id);
    free(it→second);
    _lookup_table.erase(it);
}
```

The foregoing example is in contrast to the normal code where the malloc and free operations would get directly called, and where the application would directly work on memory pointers, without any use a lookup table and the asynchronous function calls. In the example above, "mask" is a union to ease the access to the reference id and offset of the reference pointer described above, "rptr.rptr" is the 64 bit reference pointer, "rptr.mask.id" is the 32 bit reference id and "rptr.mask.offset" is the 32 bit reference offset.

Arithmetic operations on the reference pointer (i.e., rptr) behave then like normal "ptr+offset" operations. This allows to offset up to 4 GB of memory within one pointer, which should be enough for most applications. On top of this, the reference id can further encode information such as the device id, to enable device-to-device copies.

It is also possible to preallocate empty tensors ahead of time, using the operation hostAsyncMalloc(0, stream), and then return a reference pointer that is used within memcopy operations and kernel launches. On the device, when the reference pointer is to be actually used, just a call to the operation deviceAsyncMalloc(rptr, size) suffices to initialize it. This removes the necessity to preallocate all memory before a kernel call thereby potentially reducing the peak memory consumption.

Embodiments of the present invention enable the following improvements and advantages:

1) Removing synchronization operations for malloc and free operations to allow full asynchronous executions of accelerator hardware by using reference pointers that get assigned by the host system.
2) Providing a look-up table on the device to translate the reference pointers to actual memory addresses.
3) Providing an offset within the reference memory pointer design to enable addressing of sub-parts of the allocated memory region.
4) Enabling to remove unnecessary synchronization between host and accelerator systems.

5) Enabling to actually record the entire execution queue and postpone its execution (e.g., in a job scheduling system).
6) Supporting offloading to pure-accelerator-based hardware (in cases where such hardware exists).
7) Providing for only a minimal coding effort to switch from existing asynchronous execution queue APIs.

According to an embodiment of the present invention, a default offset added is 0. In this case, if the user calls "hostAyncMalloc(size, stream)" and a reference pointer is returned as, e.g., 0x0000FFFF0000000 which translates into: reference id=0x0000FFFF and reference offset=0x00000000. Assuming, e.g., the user only wants to copy back a specific element from the allocated memory buffer, the user could perform: refPtr=refPtr+15; hostAsyncMemcpy(hostPtr, refPtr, sizeof(Element)). This would copy the 15th element and not the entire memory segment.

An embodiment of a method for providing a full asynchronous execution queue for accelerator hardware in accordance with the present inventions comprises the following steps:
1) On the host, hostAsyncMalloc( ) adds a memory allocation operation to the execution queue, and returns a unique number as the reference pointer. A free operation consumes the unique reference pointer and schedules a "free" instruction into the execution queue.
2) On the device, the deviceAsyncMalloc operation added by the host allocates the requested memory size and adds an entry to a look-up table to map the unique reference number onto its corresponding memory address. The deviceAsyncFree instruction added by the hostAsyncFree operation frees the memory and removes the entry from the look-up table.
3) Whenever a reference pointer is used, it gets translated by the look-up table from reference to a corresponding memory address. The look-up table can either be implemented fully in software, or as an extension to the hardware's MMU.

The memcopy and kernel functions both translate the reference pointer to the physical memory address prior using them, e.g. via software as shown herein, or as part of the hardware.

For hardware which cannot allocate memory itself, embodiments of the present invention can still be implemented since the hostAsyncMalloc operation could be executed when the execution queue gets transferred to the device, and the free operation could be executed when the accelerator requests more work.

In an embodiment, the present invention provides a method for providing an asynchronous execution queue for accelerator hardware. The method includes replacing a malloc operation in an execution queue to be sent to an accelerator with an asynchronous malloc operation that returns a unique reference pointer. Execution of the asynchronous malloc operation in the execution queue by the accelerator allocates a requested memory size and adds an entry to a look-up table accessible by the accelerator that maps the reference pointer to a corresponding memory address.

In an embodiment, the method further comprises replacing a free operation in the execution queue to be sent to the accelerator with an asynchronous free operation that uses the reference pointer and schedules a free instruction into the execution queue to be sent to the accelerator, whereby execution of the asynchronous free operation in the execution queue by the accelerator frees the corresponding memory address and removes the entry from the look-up table.

In an embodiment, the reference pointer includes a reference id and an offset.

In an embodiment, the reference pointer is 64 bits in which 32 bits comprise the reference id and 32 bits comprise the offset.

In an embodiment, the method further comprises providing an asynchronous variadic operation which copies data in a variadic argument from original code in the execution queue into a variadic arguments stack and returns a memory offset, the variadic arguments stack being copied together to the accelerator along with the execution queue.

In an embodiment, the reference pointer is used by kernel calls and memcopy operations to determine the corresponding memory address using the look-up table.

In an embodiment, the accelerator is decoupled from a host of the accelerator and is housed in a separate enclosure together with other accelerators, the host being remotely connected to the accelerator enclosure using external interconnects.

In an embodiment, the look-up table is implemented in the accelerator by software or as an extension to a memory management unit (MMU) of the accelerator.

In another embodiment, the present invention provides a system comprising one or more processors which, alone or in combination, are configured to provide for execution of the following steps: replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address.

In an embodiment, the system is further configured to provide for execution of the following steps: replacing a free operation in the execution queue to be sent to the accelerator with an asynchronous free operation that uses the reference pointer and schedules a free instruction into the execution queue to be sent to the accelerator, whereby execution of the asynchronous free operation in the execution queue by the accelerator frees the corresponding memory address and removes the entry from the look-up table.

In an embodiment, the system is decoupled from the accelerator, which is housed in a separate enclosure together with other accelerators, the system being remotely connected to the accelerator enclosure using external interconnects.

In an embodiment, the system is further configured to implement the look-up table in the accelerator using software.

In an embodiment, the look-up table is an extension to a memory management unit (MMU) of the accelerator.

In a further embodiment, the present invention provides a tangible, non-transitory computer-readable medium having instructions thereon which, upon being executed by one or more processors, alone or in combination, provide for execution of the method according to any embodiment of the present invention.

In an even further embodiment, the present invention provides a method for suspending an application which can be used alone or preferably in conjunction with the methods according to embodiments of the present invention providing more asynchronous operations, the method comprising:

1) application gets executed;
2) execution queue gets filled;
3) accelerator job system creates copies of the data that shall be copied to the accelerator;
4) application gets suspended;
5) accelerator job system waits for free execution slot on local or remote machine;
6) copied data gets transferred to accelerator;
7) accelerator executes code;
8) results get copied back to accelerator job system; and
9) accelerator job system wakes up application and provides data.

FIG. 1 shows a conventional system in which a host 10 and a device 20 execute code in an execution queue. As can be seen, there are in each case only two kernel calls and one memcopy operation before an explicit synchronization is required in each case before a hostFree operation.

Figure 2:
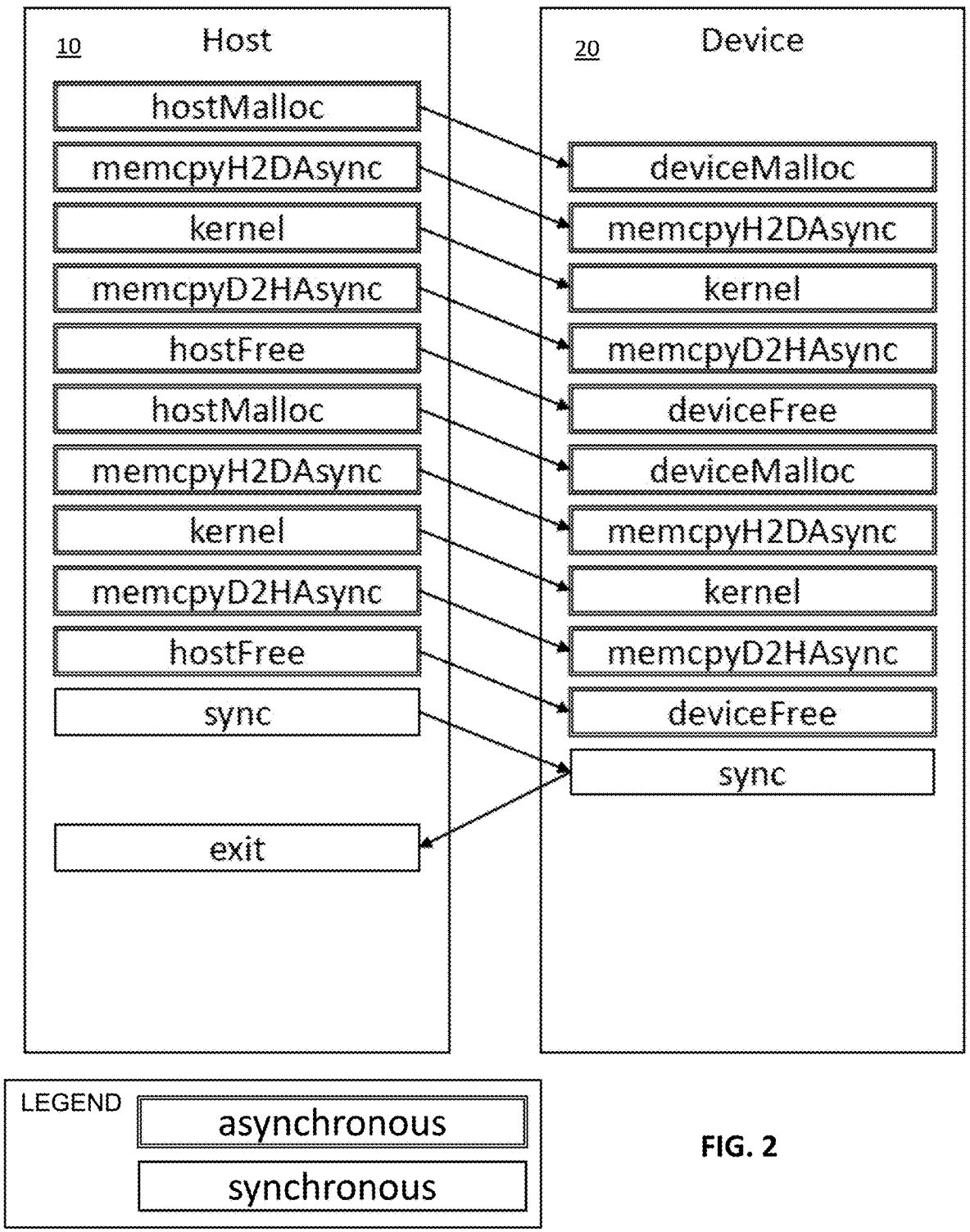
FIG. 2 illustrates the same code as in FIG. 1 which has been modified to be fully asynchronous in accordance with an embodiment of the present invention.

FIG. 2 shows the host 10 and system 20 of FIG. 1 executing the same code, but having been modified in accordance with an embodiment of the present invention so that the fully asynchronous by replacing the hostMalloc and hostFree operations in accordance with embodiments of the present invention discussed above.

Figure 3:
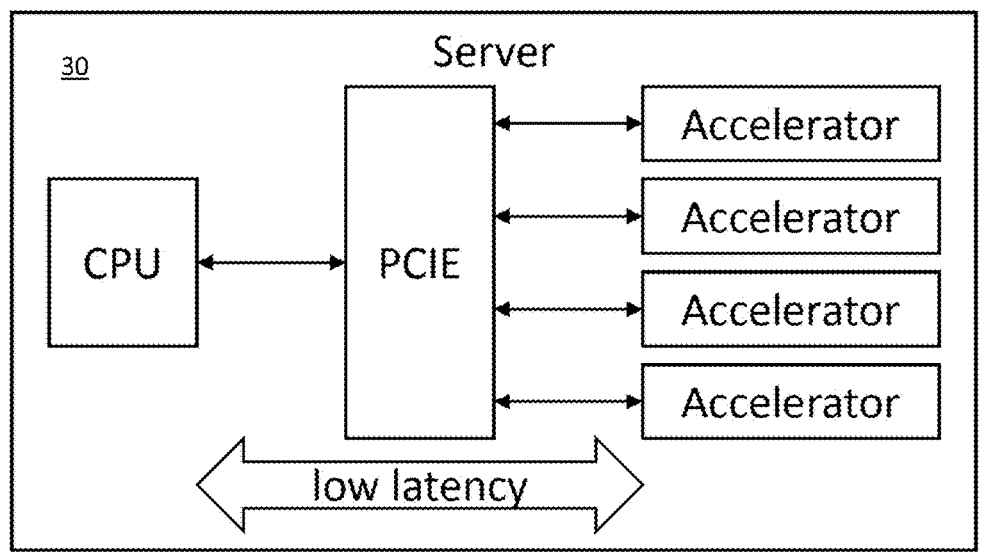
FIG. 3 schematically illustrates a conventional multi-accelerator system.

FIG. 3 shows a conventional system 30 in which multiple accelerators are connected to a CPU via PCIe in a single server enclosure. This setup is necessary because of the low latency requirement due to a high number of synchronization calls.

Figure 4:
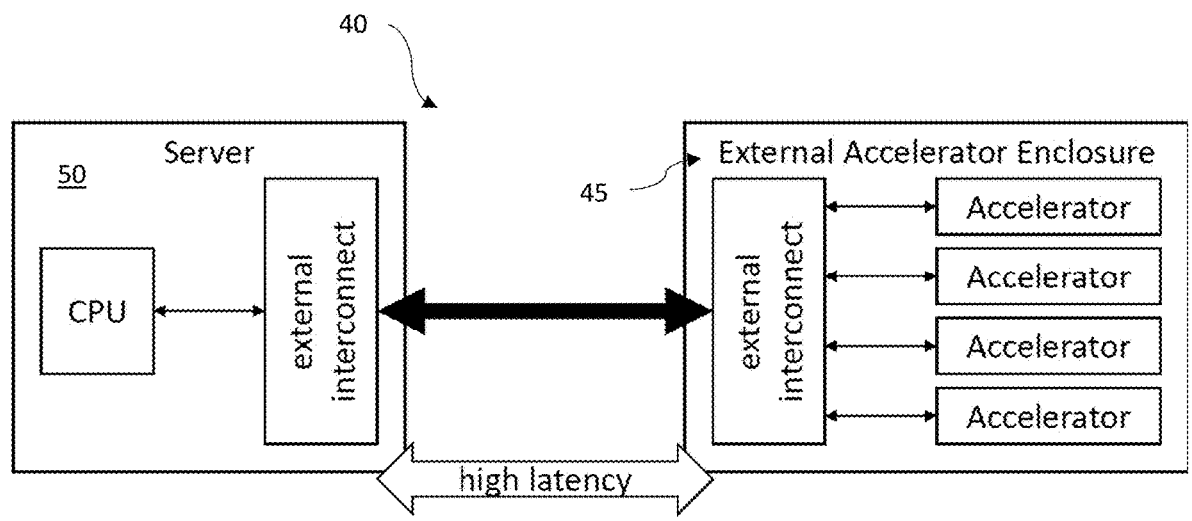
FIG. 4 schematically illustrates an external, pure accelerator enclosure in accordance with an embodiment of the present invention.

FIG. 4 shows a system 40 according to an embodiment of the present invention in which an external accelerator enclosure 45 is provided separately and remotely from the server enclosure 50 containing the CPU. The external accelerator enclosure 45 and the server enclosure 50 can be connected via external interconnects on the respective enclosures in a manner which results in relatively higher latency than in the system 30 of FIG. 3. For the reasons discussed above, embodiments of the present invention allow for higher latency by removing the need for frequent synchronization calls, thereby providing for the ability to decouple the tight integration of the device and host shown in FIG. 3 and provide the accelerator enclosure 45 which is purely accelerators in its own enclosure connectable to a number of different host systems. In this manner, the external accelerator enclosure 45 provides for a great deal of flexibility.

In the following, an embodiment of the present invention (referred to herein as "SOL") is described. Different embodiments of the present invention comprise features of this embodiment in any combination of the features of any embodiment discussed above. In particular, the methods and systems for providing a full asynchronous execution queue, as discussed above, can be used within SOL or as a feature of SOL, as discussed below.

SOL is an AI acceleration middleware that provides a hardware abstraction layer that allows to simultaneously support different hardware devices on a range of standard AI frameworks without requiring changes to the frameworks themselves in order to minimize maintenance overhead. Thus, SOL allows to transparently support heterogeneous hardware. Moreover, in fact, data scientists need only to add a few lines of code to their scripts in order to enable SOL and its hardware support. To demonstrate operability and the improvements provided by SOL, SOL was implemented for PyTorch with three backends: CPUs, GPUs and vector processors.

Two strategies can be used to integrate new devices into AI frameworks using SOL as a middleware, to keep the original AI framework unchanged and still add support to new device types. The first strategy hides the entire offloading procedure from the framework, and the second strategy only injects the necessary functionality into the framework to enable the execution, but does so without changing any PyTorch code.

In the following, the design and implementation of SOL as a framework for transparently adding heterogenous hardware device support to popular AI frameworks and for providing an asynchronous execution design for device memory allocations is discussed, along with the implementation and evaluation of the two strategies to integrate device support into AI frameworks without changing the framework's source code. An evaluation of SOL on PyTorch using CPUs, GPUs and vector processor (SX-Aurora Tsubasa by the company NEC) is also provided to demonstrate the technical improvements.

In particular, it is demonstrated that SOL enables to add device support to AI frameworks with at maximum 3,000 lines of code per device backend and 2,400 lines of code per AI framework. Further, because of the optimizing methods within SOL, it is demonstrated that SOL allows to achieve accelerated workloads up to (Inference/Training) 7.79×/2.41× (CPU), 4.37×/1.22× (GPU) and 25.41×/4.18× (SX-Aurora) compared to the reference implementations within the AI frameworks.

In the following, first some background on AI frameworks, deep neural network (DNN) optimization libraries and compilers/middleware is provided before discussing SOL and demonstrating its technical improvements.

The landscape of AI frameworks is rather vast, with Torch and Theano being among the first popular frameworks. Facebook took over the principles of Torch and switched its interface from Lua to Python, introducing PyTorch and making it to one of the most widely used frameworks today. PyTorch features a dynamic execution graph, making it very flexible and easy to program. TensorFlow by the company GOOGLE is the biggest competitor to PyTorch and uses a static execution graph (though it was recently extended to also allow for dynamic graphs). There are also other AI frameworks such as Chainer, MxNet, and CNTK, but their user base is considerably smaller than those of PyTorch and TensorFlow.

What these AI frameworks have in common is their design of their internal architecture which is illustrated on the left-hand side of FIG. 5. All of these frameworks have a frontend API, usually written in, e.g., Python, C/C++ or Java, that maps onto a C-based core. This core handles all of the framework's functionality. It manages the data on the devices and processes the computation graphs of the neural networks by issuing function calls to device specific backends. These backends either rely on hand-optimized compute kernels, written specifically for the particular AI framework, or on vendor specific libraries, which are discussed further below.

A major technical problem for hardware vendors is that there is no standard for these device backends, making it necessary to write separate code for each AI framework. DLPack is an approach for sharing data between deep learning frameworks, but it was never widely adopted. ONNX Runtime and ON-NXifi aim to create device-independent inference platforms by keeping the device layer outside the framework. With respect to training, it is believed that there is no existing work that abstracts the device layer from the AI frameworks.

Since neural networks (NNs) are very computationally intensive, hardware vendors typically provide hand-optimized libraries to accelerate NN workloads on their hardware. As hand-optimized libraries, the company INTEL provides DNNL for their CPUs and GPUs, the company NVIDIA provides CUDNN, the company AMD provides ROCm MIOpen, the company ARM provides ARMCL and the company NEC provides VEDNN. These libraries all come with similar functionality, although ARMCL only supports functions for inference. Aside from this, NNPACK provides functions for X86 and ARM64 CPUs, although its performance is no longer competitive with respect to DNNL or ARMCL. All AI frameworks usually rely on these libraries in order increase computational performance. Although the hyperparameters of NN layers are well defined, the APIs of these libraries are not, making it necessary to write separate code for each of these libraries.

TVM is an optimizing compiler architecture with a large open source community and probably the highest number of supported hardware architectures. TVM features integration for TensorFlow and PyTorch, but so far only supports inference workloads (the high level intermediate representation (IR) "relay" already supports training, but not the lower level implementations). One disadvantage of TVM for now is the very long auto-tuning, which can be up to several days, depending on the NN structure and hardware, which is needed to reach a good performance level. OpenVino of the company INTEL is a similar tool, targeting mainly INTEL hardware. NVIDIA provides TensorRT by the company NVIDIA is also a similar tool to deploy NNs for NVIDIA hardware, but is closed source.

For PyTorch, the company AMD chose to write scripts that "hiptify" (rewrite) the PyTorch source code, replacing all CUDA calls with HIP calls, as they are syntactically identical, and then having their AMD devices pose as CUDA devices within PyTorch. However, this is only possible due to considerable effort mimicking the CUDA API and all of its libraries (i.e., CUBLAS, CUSOLVER, etc.).

PlaidML and Tensor Comprehensions are both compilers that use low level mathematical formulations rather than entire layers, and transform these into specialized implementations for multiple hardware architectures. These compilers also require extensive auto-tuning to reach performance comparable to hand-optimized libraries.

Brainslug was introduced by the company NEC as a framework to accelerate workloads within AI frameworks using the depth first parallelism method. It was used as an exemplary basis of SOL's code optimization, as discussed below. Aside from optimizing AI framework workloads, SOL also can extract NNs from the frameworks and deploy in minimalistic libraries, removing all framework dependencies, enabling to integrate these into user applications for inference workloads.

NGRAPH is a framework maintained by the company INTEL and is mainly based on PlaidML to provide support for INTEL CPU+GPU, NVIDIA GPUs and AMD GPUs.

All of these approaches rely on similar optimizations ranging from high level graph transformations, mathematical and algorithmic optimizations, down to low level instruction optimizations that target specialized hardware through the use of hand-optimized libraries for work-intensive operations. In all, it is believed that there is no existing work able to add heterogeneous device support to existing AI frameworks without changing their code base.

Beside these commonalities, SOL targets some of the issues of modern AI frameworks, for example, that depending on the pass of the model execution, different memory layouts could be optimal. SOL weights up if using the same layout in forward and backward pass is faster than using separate layouts, including the necessary data transformations. Further, SOL also allows to use different implementations for forward and backward pass (e.g., to use OpenBLAS for forward and DNNL for backward computations). Also, the issue has been noted that AI frameworks address the dimensions of a tensor by its numeric value. SOL addresses this issue by instead using identifiers containing the purpose (None, Channel, Pixel) and a dimension. A tensor in NCHW format has the dimensions [N0, C0, P1, P0] or [N0, P1, P0, C0] in NHWC format. This enables SOL to make it easy to implement layers independent of the used memory layouts (e.g., by automatically selecting all channel dimensions for normalization layers, independent of how many there are). On top, SOL's code generator automatically determines necessary nested loops and how to map these onto the single instruction multiple data (SIMD) architecture of the hardware.

The following Listing 1 is an exemplary pseudocode which provides for using SOL within PyTorch. Line 5 optimizes the model, line 6 copies the parameters from py_model to sol_model and line 7 runs the optimized model.

```
Listing 1:
1  import torch
2  import sol.pytorch as sol
3  py_model       = initPyTorchModel( )
4  data           = initInputData( )
5  sol_model      = sol.optimize(py_model, data.size( ))
6  sol_model.load_state_dict(py_model.state_dict( ))
7  output         = sol_model(data)
```

SOL is an optimizing middleware for inference and training that transparently integrates into existing AI frameworks (e.g., PyTorch or TensorFlow). It was designed to have a very small programming footprint towards the user, and a data scientist only needs to add a few lines of code to enable SOL (see Listing 1 above).

Beyond transparency, SOL was explicitly designed to support multiple AI frameworks (also referred to as frontends) and hardware devices (also referred to as backends), including X86 and ARM64 CPUs, NVIDIA GPUs and the NEC SX-Aurora vector processor. The core of SOL targets SIMD architectures in order to leverage common features across all of these hardware architectures within the same code base. This allows to write and maintain very small device backends. FIG. 6 provides an overview of currently implemented modules).

SOL consists of two main components, the compiler and the runtime.

The SOL compiler is triggered by the call to sol.optimize( . . . ), which extracts the computation graph from the framework and translates it into SOL's own graph IR. First, SOL analyzes this graph and applies general mathematic optimizations (e.g., a ReLU (y=max(x, ⊙)) followed or preceded by a MaxPooling which can be removed from the graph when the minimum value of the Pooling gets set to 0. In other cases, the order of layers can be switched without changing the mathematics, which can result in better data reuse.

After these initial high level optimizations, the IR gets cloned for each device type in order to apply device-specific optimizations. First, it is determined which optimizing method to apply to which layer. This can be done purely heuristically, where all layers except convolution layers and linear layers get implemented using the depth first parallelism (DFP) module. The main idea of DFP is to process computation graphs in depth first order, to keep data as long as possible in a processor's registers and caches. To achieve this, the DFP modules applies loop-transformation and fusion methods. The insight behind the DFP principle is to generate code that minimizes the number of nested loops while efficiently mapping these onto the SIMD architecture of the hardware. The DFP module can handle arbitrary SIMD architectures from very short AVX instructions to very long SX-Aurora vectors, and it is also able to make use of features such as shared memory and SIMD-groups (warps).

Convolution and linear layers get implemented with the DNN module, which maps these layers onto external libraries, such as CUDNN or DNNL. There is one exception: if the convolution layer is grouped and has as many groups as output channels (e.g., in MobileNet) they get also implemented using the DFP module, as this boils down to a WeightedPooling layer that can make use of the depth first processing.

SOL further determines optimal memory layouts for the given data (e.g., DNNL prefers blocked memory layouts) and takes care that data are always given in the optimal layout to the layers, while trying to minimize the number of reorder operations. For example, it turns out that, for the linear layer, untransposed weights (Output/Input Channels) work best for CPUs while (Input/Output Channels) is faster on the NEC SX-Aurora.

In case there are multiple libraries, algorithms or layouts available to implement one of these layers, it is possible to either use heuristics or run a very short auto-tuning workload to determine the best combination given the layer's hyperparameters. SOL can mix the usage of different implementations, algorithms and layouts between forward and backward pass to achieve higher performance.

After all layers have been assigned to an optimizing module, SOL generates code for these and compiles it for the target devices. This entire optimization procedure requires usually less than one minute (including the auto-tuning) and only needs to be repeated if the input size of the network or its structure change. After compilation, SOL injects a custom model into the AI framework so that the user can use it the same way he would use a native model, with the difference that the SOL model internally calls the optimized implementation when executed. The following Listing 2 is an exemplary pseudocode for integrating the custom models of SOL into PyTorch.

```
Listing 2:
1  class SolModel(torch.nn.Module):
2    def __init__(self):
3      self.param_0 = ... [# managed by framework]
4      self.param_1 = ... [# managed by framework]
5
6    def forward(self, input):
7      return sol.call(...) [# executed by SOL]
```

The SOL runtime component connects the kernels with the framework's memory allocation system. This makes it possible to directly read and write into the framework's tensors without the need to copy between the framework's and SOL's memory space. Also, AI frameworks usually preallocate device memory to speed up allocations, which would limit the opportunity to maintain a separate memory space. Further, the runtime component is responsible for loading the optimized kernel functions, maintaining all communications between SOL, the framework and the devices' APIs.

Deployment of SOL is a special mode of the SOL compiler, that extracts the NN from AI frameworks to deploy it into a library that can be integrated into a user application, similar to TVM, TensorRT or OpenVino. This specialized NN library does not have any dependencies of the AI framework or SOL, only when specialized functions are used from libraries such as DNNL or CUDNN.

SOL device backends are very compact and easy to maintain. Each device relies on one or multiple functional-backends that implement the functionality for the DFP and DNN modules.

The DFP backends use a code generator that outputs standard C++ code. Only a few function calls need to be overwritten to add device-specific "flavors" to the generated code. Within the DFP generated code, functions (e.g., sol_is-pc_exp) are used that map onto device-specific implementations. In most cases, this is just a #define sol_ispc_exp(A) exp(A) but also can contain specialized implementations in case the device does not have specific instructions for the given function. Listing 3 below shows how an AveragePooling layer is described within the DFP module and how it is translated into code for the different device backends.

The DNN backends only provide minimal functionality to initialize the libraries descriptors and the ability to call the necessary library functions. The descriptors get initialized once the neural network gets loaded and cached, to decrease time during model execution. Further, the backends can implement specialized auto-tuning functions to determine optimal algorithms or memory layouts at compile time.

On top of these modules, the device backend can determine if the main thread shall run on the host system or the device. This can reduce communication overhead between host and device, if the devices supports this implementation.

The following Listing 3 is exemplary pseudocode for an AveragePooling layer in the DFP description and shows how it is translated to the different backends.

```
Listing 3:
1  [// DFP: AveragePooling]
2  auto I = layer(1->src( )), O = layer(1);
3  auto K = kernel(1);
4  loop( ); O += I[K];
5  loop( ); O /= K.area(p->isCountPadding( ));
6
7  [// Reference: standard C++]
8  void kernel(const float* L0, float* L1) {
9    for(int OC0idx = 0; OC0idx < 512; OC0idx++)
10     for(int OP1 = 0; OP1 < 128; OP1++)
11       for(int OP0 = 0; OP0 < 128; OP0++) {
12         float L1_s = 0;
13         for(int K1 = 0; K1 < 3; K1++)
14           for(int K2 = 0; K2 < 3; K2++)
15             L1_s += L0[OC0idx * 16384 + (OP1 + K1)
                   * 128 + (OP0 + K0)];
16         L1[OC0idx * 16384 + OP1 * 128 + OP0] = L1 s
                   /9;
17  }}
18
19 [// Backend-ISPC: X86 and ARM64]
20 task void kernel(const uniform float* uniform
       L0, uniform float* uniform L1) {
21   uniform int OC0idx = taskindex;
22   foreach(OP1 = 0 ... 128, OP0 = 0 ... 128) {
23     float L1_s = 0;
24     for(uniform int K1 = 0; K1 < 3; K1++)
25       for(uniform int K2 = 0; K2 < 3; K2++)
26         L1_s += L0[OC0idx * 16384 + (OP1 + K1)
                   * 128 + (OP0 + K0)];
27     L1[OC0idx * 16384 + OP1 * 128 + OP0] = L1_s
                   /9;
28  }}
29
30 [// Backend-CUDA: NVIDIA]
```

-continued

```
31  __global__ void kerel(const float* L0, float*
       L1){
32     int OC0idx = blockIdx.x;
33     for(int OP0idx = threadIdx.x; i < 16384; i +=
         blockDim.x) {
34       int OP1 = OP0idx /128, OP0 = OP0idx % 128;
35       float L1_s = 0;
36       for(int K1 = 0; K1 < 3; K1++)
37         for(int K2 = 0; K2 < 3; K2++)
38           L1_s += L0[OC0idx * 16384 + (OP1 + K1)
               * 128 + (OP0 + K0)];
39       L1[OC0idx * 16384 + OP0idx] = L1_s/9;
40  }}
41
42  [// Backend-NCC: NEC SX-Aurora]
43  void kerel(const float* L0, float* L1) {
44    [#pragma omp parallel for collapse(2)]
45    for(int OC0idx = 0; OX0idx < 512; OC0idx++) {
46      [#pragma _NEC ivdep]
47      for(int OP0idx = 0; i < 16384; i++) {
48        int OP1 = OP0idx /128, OP0 = OP0idx %
             128;
49        float L1_s = 0;
50        for(int K1 = 0; K1 < 3; K1++)
51          for(int K2 = 0; K2 < 3; K2++)
52            L1_s += L0[OC0idx * 16384 + (OPI + K1)
                 * 128 + (OP0 + K0)];
53        L1[OC0idx * 16384 + OP0idx] = L1_s/9;
54  }}}
```

In the following, the exemplary implementation of SOL's backends for CPU, GPU and the SX-Aurora are described.

The backends for X86 and ARM64 both rely on the compiler ISPC for the DFP generated code, as it allows to write very efficient vectorizable code. As shown in Listing 3, the syntax of ISPC varies from standard C++ by keywords such as uniform (identifying a scalar variable) and foreach (identifying a vectorized loop), but most of the structure is identical to writing this in standard C++. For the DNN module, SOL's CPU backends supports OpenBLAS, DNNL (only X86) and NNPACK.

The NVIDIA backend bears a close resemblance to the CPU one, except that it relies on CUDA for the DFP module and CUBLAS and CUDNN for the DNN module. Again Listing 3 shows the differences. On top of the CPU backend, it supports to use SIMD vector groups, which means that instead of using the full vector length and sharing data using shared memory between the different warp, SOL uses only the warp for vectorization. This allows to run multiple warps in parallel, on different parts of the data, which improves performance in situations where the available loops do not allow to leverage the combined SIMD processing of all warps. For DNN, the NVIDIA provided libraries CUDNN and CUBLAS were used.

The NEC SX-Aurora Tsubasa is a vector processor PCIe card. The SX-Aurora was not specifically designed for NN processing, but for more traditional high performance computing (HPC) applications, such as numeric simulations. As a result, it lacks AI-specific functionality such as tensor cores and float 16 support. However, HPC clusters today need to run various kinds of workloads including AI. To solve this, an SX-Aurora SOL device backend was implemented to transparently enable AI on this accelerator.

Developing the SX-Aurora backend for SOL was straightforward, as the accompanying NCC compiler supports the C++ 14 standard and only requires very few pragmas to be told which loop to vectorize. The DFP module is fairly slim, and uses knowledge of vector lengths to ensure that vector instructions are not underutilized.

For the DNN module, the VEDNN library that was originally implemented for the TensorFlow-VE project was used. It contains optimized implementations for convolution, linear, MaxPooling, SoftMax and activation layers, but only the convolution and linear implementations were used within SOL. Additionally, the SX-Aurora BLAS library was used as a secondary implementation for linear layers. For both libraries, modified OpenMP implementations were used for task parallelism, as the default implementations weakly scale.

As SOL and the AI frameworks are running on the host system, the VEoffload library was used to launch kernel functions on the SX-Aurora. It features a CUDA API-like programming model to asynchronously offload kernels onto the device. However, it has latency issues because the execution queue is operated by the host system. To address this, a specialized asynchronous execution queue was built on top of the library specialized for the needs of SOL. According to an embodiment, the design mainly mimics the principles of CUDA streams, but extends it with asynchronous malloc and free operations. As this does not directly allocate memory immediately, a 64-bit integer is instead returned, where the first 32 bits contain a unique reference number and the second 32 bits can be used to offset the pointer. This allows to use this virtual pointer with normal pointer computations and removes the need to synchronize malloc and free operations, increasing the asynchrony of the processing.

As a final optimization, multiple adjacent memcopy operations are gathered and grouped together within the asynchronous execution queue. If only a small number of small tensors need to be transferred, the latency-optimized VEoffload memcopy methods are used. Otherwise, we use the peak bandwidth optimized VEO-udma library is used, which supports packed memcopy operations so that many small tensors can be packed into a big data segment to speed up transfers.

To integrate SOL into AI frameworks the so-called frontends are used. For the PyTorch frontend, there are two possible strategies: 1) transparent offloading, as it seamlessly integrates into the framework with only a minimal interaction between PyTorch and the device backends; and 2) native offloading which requires much tighter integration with the framework, but yields higher performance during training.

The idea behind transparent offloading is to add device support to the AI framework with as minimal effort as possible. TensorFlow's Keras API was used as a starting point, as it exposes two functions model.predict( ) and model.fit( ) for prediction and training to the user, both of which consume Numpy arrays located on the host system as input so the user does not need to care about where the model is actually run.

Normally when a model is executed, SOL checks on which device the input data is located and executes all computations on that device. To enable transparent offloading of computations, the user just needs to call the function sol.device.set(DEVICE, DEVICE_IDX) once prior executing the model. The next time a model gets executed, SOL recognizes that the data is located on the host, but that the user requests to execute on another device. SOL then will ensure that the necessary data is copied to the device and will execute the model on it instead.

SOL injects its model into PyTorch's execution environment as a custom layer (shown in Listing 2 above). This keeps the model parameters inside PyTorch, so that SOL can leverage all available learning methods without the need to implement these itself, and only execute the computationally intensive calculations within SOL.

One problem are the model parameters. As these are needed on the device, it would be necessary to either copy them every time a model gets executed or to cache these on the device. The latter was chosen in this example. When the model gets run for the first time, a specialized offloading context is created that contains copies of all model parameters. As long as the model parameters do not get modified and the model does not get destroyed, this context is kept alive to prevent continuous memcopy operations between the host and the device, limiting memcopy operations between host and device to just the input and output data.

While this works pretty well for inference, it is inefficient for training where the model changes in each epoch, as this requires to not only retransfer the updated weights in each epoch, but also to transfer all gradients from the device to the host after the backward pass, as the gradient upgrade is processed on the host system. One solution would be to implement the parameter management and learning methods also within SOL. However, these features have different implementations across AI frameworks, so portability is far from guaranteed. As a result, it was decided to explore tighter integration with the framework.

With respect to the native offloading strategy, support for X86, ARM64 and NVIDIA GPUs is already available in most AI frameworks, which allows SOL to directly connect to their public API to have access to all of the necessary framework functionality and to share the memory space on the device with the framework.

The SX-Aurora is not supported by these frameworks. AI frameworks such as PyTorch and TensorFlow are built for multi-device support in mind and, consequently, both of them support registering function callbacks for a specific device. As these frameworks target extensibility, these callback registrations are exposed to other libraries. It was attempted to see if it would be possible to integrate all the necessary operations into PyTorch without even changing a single line of code, which would allow to extend PyTorch without initializing a tedious upstreaming and maintenance process. In principle, the goal was to be able to replace the entire lower device layer implementation of PyTorch for the SX-Aurora with SOL. In the following, reference is made to source code files and these refer to the PyTorch source code for version 1.4.0 of PyTorch.

First, it was analyzed how PyTorch distinguishes devices. Unfortunately, it was discovered that PyTorch uses a fixed enum (c10/core/DeviceType.h), which cannot be extended from the outside, so it was decided to just take one of the existing devices (OpenCL, XLA or HIP) for which, as in the default installation package, only CPU and CUDA are used. The c10::RegisterOperators class enables to register the necessary callbacks for devices within the device enum, as shown in Listing 4 below.

However, digging further through the source code reveals that some functions do not get registered in the c10::RegisterOperators registry, but rely on the class at::native::DispatchStub (ATen/native/DispatchSub.h) that only stores separate function pointers for CPU, CUDA and HIP (Listing 5 below shows an excerpt of that class). As CPU and CUDA are already used within the default package, HIP was chosen as the device type.

The following Listing 4 is exemplary pseudocode to register a method and to PyTorch's callback registry.

```
Listing 4:
1 at:: Tensor __and__(const at::Tensor& A, const at
    ::Tensor& B) { ... }
2 static auto registry = c10::RegisterOperators( )
3   .op(c10:: RegisterOperators:: options( )
4   .schema("aten::and.TensorfTensorself.
      Tensorother)->Tensor")
5   .kernel<at: :Tensor(const at: :Tensor&, const at
      ::Tensor&)>(TENSOR_TYPE_ID, &_and_)
6   .aliasAnalysis(c10:: AliasAnalysisKind::
      FROM_SCHEMA))
```

The following Listing 5 is exemplary pseudocode for PyTorch's DispatchStub that only supports CPU, CUDA and HIP functions.

```
Listing 5:
1 template <typename rT, typename T, typename...
    Args>
2 struct DispatchStub<rT (*)(Args...), T> {
3   // ...
4   FnPtr cpu_dispatch_ptr;
5   FnPtr cuda_dispatch_ptr;
6   FnPtr hip_dispatch_ptr;
7   // ...
8 };
```

Before the callbacks can be implemented, it is necessary to set up some basic functionality, e.g., implementing the at::HIPHooksInterface which contains methods to determine the number of available devices in the system, or the default device index. Further, it is necessary to implement the at::Allocator interface, which becomes the default allocator for the given device. This is already enough to start implementing the first kernel calls.

The goal was to at least support the ability to print the contents of a tensor, copy data between host and the device and to run inference and training workloads. For this, a series of small functions were implemented to create and reshape tensors, to fill tensors with scalar values and to read scalar values from within the tensor. Further, some arithmetic kernels, such as reductions (min, max, mean), unary (add, sub, div, mul, . . . ), logical (lt, le, gt, ge, . . . ), operations to concatenate multiple tensors, binary (and, or, . . . ) and finally calculations for the loss functions were used. This is sufficient to enable all of the required features.

SOL was evaluated under the aspect of how much effort it took to support the different processor architectures and how well SOL performed compared to the standard AI frameworks.

As mentioned above, SOL requires minimal programming effort. SOL was designed to easily support different hardware architectures and frameworks. The X86 backend requires about 3,000 lines of code. ARM64 requires only about 300 additional lines as it inherits most of its functionality from the X86 backend. The NVIDIA GPU backend requires about 2,400 lines of code and the NEC SX-Aurora about 2,200 lines of code, plus 800 lines dedicated to the kernels required for the native tensor integration. It was concluded that adding a device to SOL requires at maximum 3,000 lines of code. In comparison, it was identified that over 26,000 lines of code for CPU and over 47,000 lines of code were solely dedicated to NVIDIA GPUs within PyTorch.

Table 1 below shows the hardware devices used in the evaluation.

TABLE 1

| Vendor | Model | Type | TFLOP/s | Bandwidth (GB/s) |
|---|---|---|---|---|
| Intel | Xeon Gold 6126 | CPU | 0.88 | 119.21 |
| NEC | SX-Aurora VE10B | VPU | 4.30 | 1200.00 |
| NVIDIA | Quadro P4000 | GPU | 5.30 | 243.30 |
| NVIDIA | Titan V | GPU | 14.90 | 651.30 |

The frontend integration into PyTorch is about 1,200 lines of code for extracting the NN, injecting the SOL optimized model and to hook up to the X86 and NVIDIA memory allocators to share the memory space with PyTorch. The native tensor integration of the SX-Aurora required about another 1,200 lines of code. In total, this is a relatively small programming effort. It took a single programmer about two weeks to identify all entry points and implement the required callbacks and kernel functions.

To evaluate the performance of SOL, tests were run for inference and for training on an INTEL Xeon 6126, an NEC SX-Aurora Tsubasa, an NVIDIA mid-range Quadro P4000 and high-end Titan V (see Table I for specifications).

PyTorch 1.4.0 was used as a baseline for the CPU and GPUs. As the SX-Aurora is not supported by PyTorch, TensorFlow-VE 2.1 was used instead. The reference software was installed using the official unmodified pip packages. In the following and FIG. 7, the native execution embodiment is referred to as SOL and the transparent offloading embodiment is referred to as SOL (OT).

As SOL currently supports convolutional neural networks (CNNs) and multi-layer perceptrons (MLPs), popular NN architectures were run from these domains. SOL has been tested with all models from the TorchVision package. The following reports results from Densenet, Resnet, Squeezenet, VGG, ShuffleNet v2, and MNasNet (two versions each) and a 3-layer MLP with 8192 features and a ReLU activation functions. ShuffleNet is not supported by TensorFlow-VE 2.1 as it does not support 5D permutations. The CNN's input data is a tensor with the dimensions [B, 3, 224, 224] where B stands for the batchsize. Every experiment was repeated 100 times.

The performance evaluation started with inference. The models were run with B=1. For the CPU, it was found that SOL is able to speed up the CNN models significantly compared to the reference within PyTorch. For the MLP, there was no difference visible. MLPs do not provide optimization capabilities to SOL as it mainly relies on matrix multiplications. In the SX-Aurora chart, it was found that TF-VE is always significantly slower than SOL. This is due to the VEDNN library, that only parallelizes over the batch elements, so that only one out of eight SX-Aurora cores is active. SOL can use a modified version of VEDNN with a different, OpenMP-based parallelization to overcome these problems. Further, there is no difference to be seen between the transparent and native offloading model, as the data needed to be copied in inference is too small to make an actual difference. In the GPU cases, it was found that SOL outperforms PyTorch especially in DenseNet, Squeezenet and ShuffleNet. Overall, it was found SOL is always faster than the baseline implementations in the inference tests on all devices.

Figure 7:
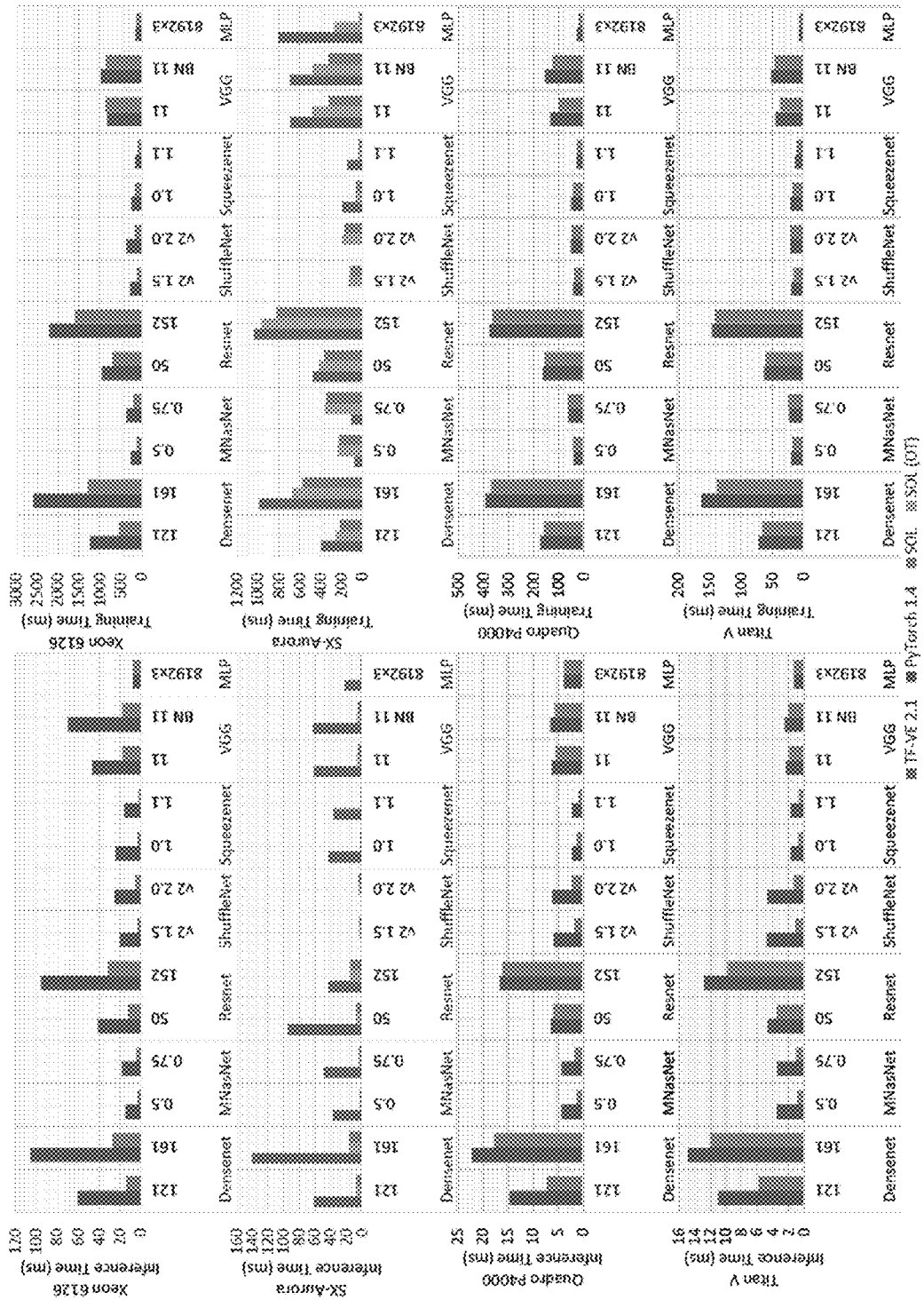
FIG. 7 graphically illustrate the results of an evaluation of SOL illustrating computational improvements.

With respect to training, for evaluating the CNNs B=16 was used and for evaluating the MLPs B=64 was used. The results are shown in FIG. 7. As before, for the CPU, it was found that SOL is always faster, especially in Densenet where the execution time is more than halved. For the SX-Aurora, it was found that TF-VE is always slowest except for the MNasNet. It was identified that SOL's code generated for the grouped convolutions is slower than the implementation within VEDNN, which are used in TF-VE. For the other networks, SOL outperforms TF-VE with both execution modes while, as expected, the native offloading always yields in higher performance, because of reduced memcopy operations between the host and the device. The GPU performance gain of SOL is not as high as for the inference cases, but still never slower than PyTorch.

In the graphs of FIG. 7 for the Xeon 6126, Quadro P4000 and Titan V, the bars on the left correspond to PyTorch 1.4.0 and the bars on the right correspond to SOL. In the graphs of FIG. 7 for the SX-Aurora, the bars on the left correspond to TF-VE 2.1, the bars in the middle correspond to SOL (OT) and the bars on the right correspond to SOL.

In sum, SOL is an AI workload acceleration middleware that makes it relatively easy to add support for a wide range of heterogeneous hardware devices to existing AI frameworks such as PyTorch and TensorFlow. SOL's device backends add such support without having to modify the actual framework's code, avoiding any upstreaming and maintenance hassles. It would also be possible to add native tensor support for non-supported devices to other frontends (e.g., TensorFlow). In addition, it is also possible to support different kinds of networks such as transformers and recurrent neural networks (RNNs).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing an asynchronous execution queue for accelerator hardware, the method comprising:
    replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address; and replacing a free operation in the execution queue to be sent to the accelerator with an asynchronous free operation that uses the reference pointer and schedules a free instruction into the execution queue to be sent to the accelerator, whereby execution of the asynchronous free operation in the execution queue by the accelerator frees the corresponding memory address and removes the entry from the look-up table.

2. The method according to claim 1, wherein the reference pointer includes a reference id and an offset.

3. The method according to claim 2, wherein the reference pointer is 64 bits in which 32 bits comprise the reference id and 32 bits comprise the offset.

4. The method according to claim 1, further comprising providing an asynchronous variadic operation which copies data in a variadic argument from original code in the execution queue into a variadic arguments stack and returns a memory offset, the variadic arguments stack being copied together to the accelerator along with the execution queue.

5. The method according to claim 1, wherein the reference pointer is used by kernel calls and memcopy operations to determine the corresponding memory address using the look-up table.

6. The method according to claim 1, wherein the accelerator is decoupled from a host of the accelerator and is housed in a separate enclosure together with other accelerators, the host being remotely connected to the accelerator enclosure using external interconnects.

7. The method according to claim 1, wherein the look-up table is implemented in the accelerator by software or as an extension to a memory management unit (MMU) of the accelerator.

8. A system comprising one or more processors which, alone or in combination, are configured to provide for execution of the following steps:

replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address; and replacing a free operation in the execution queue to be sent to the accelerator with an asynchronous free operation that uses the reference pointer and schedules a free instruction into the execution queue to be sent to the accelerator, whereby execution of the asynchronous free operation in the execution queue by the accelerator frees the corresponding memory address and removes the entry from the look-up table.

9. The system according to claim 8, wherein the system is decoupled from the accelerator, which is housed in a separate enclosure together with other accelerators, the system being remotely connected to the accelerator enclosure using external interconnects.

10. The system according to claim 8, being configured to implement the look-up table in the accelerator using software.

11. The system according to claim 8, wherein the look-up table is an extension to a memory management unit (MMU) of the accelerator.

12. A tangible, non-transitory computer-readable medium having instructions thereon which, upon being executed by one or more processors, alone or in combination, provide for execution of the following steps:

replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address; and replacing a free operation in the execution queue to be sent to the accelerator with an asynchronous free operation that uses the reference pointer and schedules a free instruction into the execution queue to be sent to the accelerator, whereby execution of the asynchronous free operation in the execution queue by the accelerator frees the corresponding memory address and removes the entry from the look-up table.

13. A method for providing an asynchronous execution queue for accelerator hardware, the method comprising:

replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address, wherein the reference pointer includes a reference id and an offset, and wherein the reference pointer is 64 bits in which 32 bits comprise the reference id and 32 bits comprise the offset.

14. A method for providing an asynchronous execution queue for accelerator hardware, the method comprising:

replacing a malloc operation in an execution queue to be sent to an accelerator with an asynchronous malloc operation that returns a unique reference pointer, whereby execution of the asynchronous malloc operation in the execution queue by the accelerator allocates a requested memory size and adds an entry to a look-up table accessible by the accelerator that maps the reference pointer to a corresponding memory address; and providing an asynchronous variadic operation which copies data in a variadic argument from original code in the execution queue into a variadic arguments stack and returns a memory offset, the variadic arguments stack being copied together to the accelerator along with the execution queue.

* * * * *